(12) United States Patent
Ueda et al.

(10) Patent No.: US 7,770,442 B2
(45) Date of Patent: Aug. 10, 2010

(54) TIRE RECEIVING FORCE SENSING APPARATUS

(75) Inventors: Yusuke Ueda, Nishio (JP); Motonori Tominaga, Anjo (JP)

(73) Assignee: Nippon Soken, Inc., Nishio (JP)

( * ) Notice: Subject to any disclaimer, the term of this patent is extended or adjusted under 35 U.S.C. 154(b) by 122 days.

(21) Appl. No.: 12/229,190

(22) Filed: Aug. 20, 2008

(65) Prior Publication Data
US 2009/0049929 A1 Feb. 26, 2009

(30) Foreign Application Priority Data
Aug. 23, 2007 (JP) .............................. 2007-217524

(51) Int. Cl.
*G01M 17/02* (2006.01)
(52) U.S. Cl. ....................................... 73/146
(58) Field of Classification Search ........................ None
See application file for complete search history.

(56) References Cited

U.S. PATENT DOCUMENTS

| | | | | |
|---|---|---|---|---|
| 5,086,649 | A * | 2/1992 | Yamaoka | .................. 73/117.03 |
| 5,561,415 | A * | 10/1996 | Dieckmann | .................. 340/444 |
| 5,975,541 | A * | 11/1999 | Harara et al. | ............. 280/5.524 |
| 6,006,597 | A * | 12/1999 | Miyazaki | .................. 73/115.07 |
| 6,126,177 | A * | 10/2000 | Steinert | ...................... 280/5.5 |
| 6,622,996 | B2 * | 9/2003 | Mayerbock et al. | ....... 267/141.3 |
| 6,915,708 | B2 | 7/2005 | Isono | |
| 7,178,818 | B2 * | 2/2007 | Katagiri et al. | ........ 280/124.144 |
| 7,316,159 | B2 * | 1/2008 | Fujioka et al. | ................. 73/146 |
| 2004/0201196 | A1 | 10/2004 | Katagiri et al. | |
| 2006/0049603 | A1 | 3/2006 | Katagiri et al. | |
| 2007/0102890 | A1 | 5/2007 | Katagiri et al. | |
| 2008/0211198 | A1 | 9/2008 | Joki | |

FOREIGN PATENT DOCUMENTS

| | | |
|---|---|---|
| JP | 2003-014563 | 1/2003 |
| JP | 2004-017917 | 1/2004 |

OTHER PUBLICATIONS

Office action dated Dec. 5, 2008 in European Application No. 08013770.

* cited by examiner

*Primary Examiner*—Lisa M Caputo
*Assistant Examiner*—Jermaine Jenkins
(74) *Attorney, Agent, or Firm*—Harness, Dickey & Pierce, PLC

(57) ABSTRACT

Each of a plurality of distance sensors is provided adjacent to a corresponding one of a plurality of displaceable portions that are displaced upon application of at least one of a brake force and a drive force to a tire. Each distance sensor measures an amount of displacement of the corresponding displaceable portion upon the application of the at least one of the brake force and the drive force to the tire. An ECU computes a target tire receiving force component based on the amounts of displacement, which are measured with the plurality of displacement measurement sensors, respectively, while eliminating an unnecessary tire receiving force component.

5 Claims, 3 Drawing Sheets

TIRE RECEIVING FORCE SENSING APPARATUS

CROSS REFERENCE TO RELATED APPLICATION

This application is based on and incorporates herein by reference Japanese Patent Application No. 2007-217524 filed on Aug. 23, 2007.

BACKGROUND OF THE INVENTION

1. Field of the Invention

The present invention relates to a tire receiving force sensing apparatus.

2. Description of Related Art

When a tire receiving force (i.e., a force applied to a tire of a vehicle) can be sensed, it is possible to more accurately perform a vehicle control operation, such as a brake control operation. Therefore, the tire receiving force can be considered as an important state quantity in the vehicle control operation. Japanese Unexamined Patent Publication No. 2003-14563 (corresponding to U.S. Pat. No. 6,915,708) teaches an apparatus for sensing the tire receiving force. In this apparatus, a sensing device is provided between a wheel and a hub to measure a tire receiving force.

In the tire receiving force sensing apparatus, since the sensing device is provided between the wheel and the hub, the sensing device needs to be rotated integrally with the wheel and the hub. Thus, the sensing device needs to be installed to the wheel by using tire installation bolts and also needs to be installed to the hub by using hub installation bolts. Thus, the installation operation is not easy.

In addition, since the structure should be modified to enable installation of the above-described bolts, the structure is complicated. In addition, the sensing device includes two separate housings, and the tire receiving force is sensed based on a relative displacement between the housings. Thus, the sensing device needs to have a sensing member, which is received in the housings and measures the relative displacement between the housings. Because of the above construction, the structure is further complicated.

SUMMARY OF THE INVENTION

The present invention addresses the above disadvantages. Thus, it is an objective of the present invention to provide a tire receiving force sensing apparatus, which has a relatively simple structure and enables easy installation thereof.

To achieve the objective of the present invention, there is provided a tire receiving force sensing apparatus that senses a tire receiving force, which is applied to a tire of a vehicle. The tire receiving force sensing apparatus includes a plurality of displacement measurement sensors and a computing means. Each of the plurality of displacement measurement sensors is provided adjacent to a corresponding one of a plurality of displaceable portions that are displaced upon application of at least one of a brake force and a drive force to the tire. Each of the plurality of displacement measurement sensors measures an amount of displacement of the corresponding one of the plurality of displaceable portions upon the application of the at least one of the brake force and the drive force to the tire. The computing means is for computing a target tire receiving force component based on the amounts of displacement, which are measured with the plurality of displacement measurement sensors, respectively, while eliminating an unnecessary tire receiving force component.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
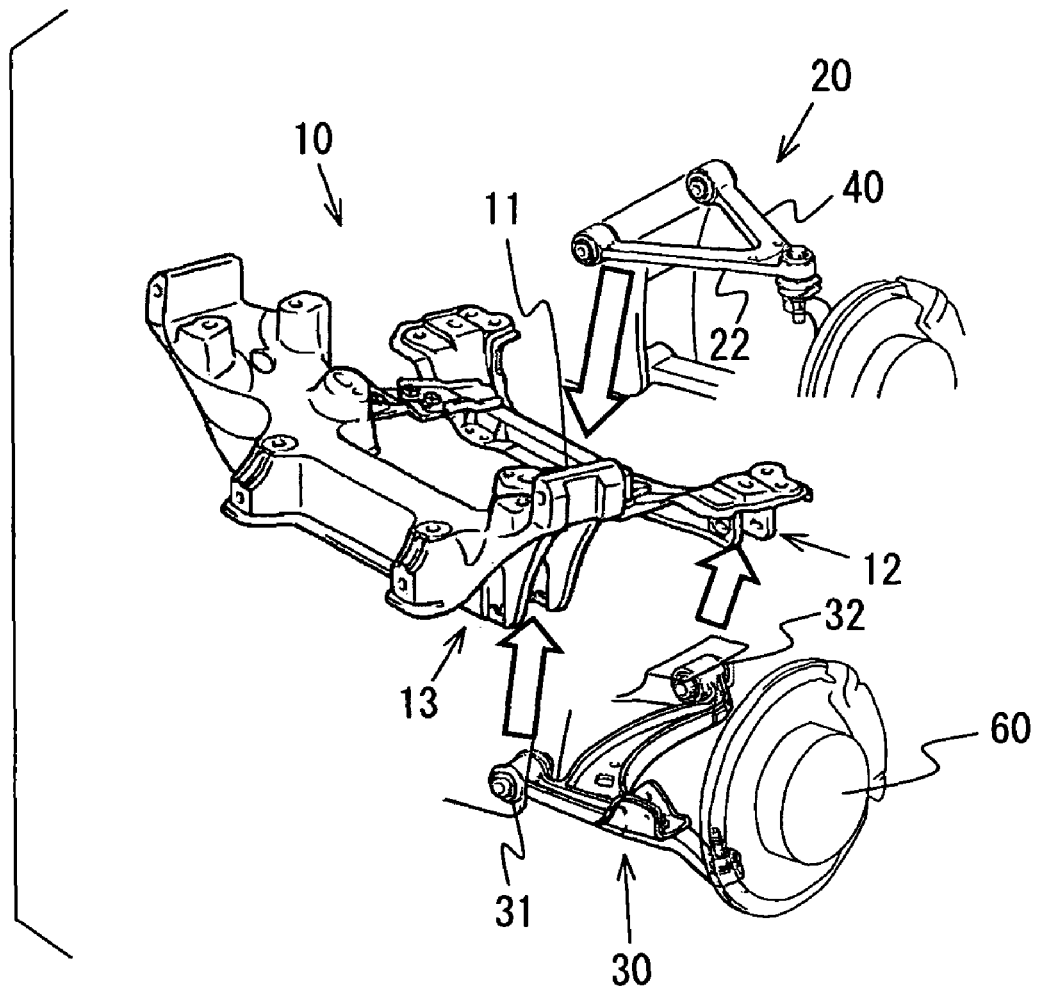
FIG. 1 is an exploded perspective view showing a suspension device of a vehicle according to an embodiment of the present invention.

A tire receiving force sensing apparatus according to an embodiment of the present invention will be described with reference to the accompanying drawings. FIG. 1 is an exploded perspective view showing a suspension device of a vehicle. With reference to FIG. 1, a suspension member 10 is a constituent member of a vehicle body and is connected to other constituent members of the vehicle body, such as a body shell and a frame, with bolts. The suspension member 10 is not movable relative to the other constituent members of the vehicle body.

The suspension member 10 supports an upper arm 20 and a lower arm 30, which are components of the suspension device. An upper support portion 11 and two lower support portions 12, 13 are formed in the suspension member 10. The upper support portion 11 supports the upper arm 20. The lower support portions 12, 13 support the lower arm 30.

The upper arm 20 is configured into a V-shape body, in which two rod members 21, 22 are joined together at one ends thereof. The joined part, at which the rod members 21, 22 are joined together, is fixed to a knuckle 40. At the other end of the upper arm 20, the other ends of the rod members 21, 22 hold the upper support portion 11 of the suspension member 10 therebetween and are connected to the upper support portion 11 with a bolt 50 and a nut 51 (see FIG. 2). A rubber bush (not shown) is press fitted to the corresponding connection. In the connected state where the upper arm 20 is connected to the upper support portion 11, the upper arm 20 can move (pivot) vertically about the axis of the bolt 50.

The lower arm 30 includes two end portions 31, 32 on the opposite side, which is opposite from a wheel 60 of a tire. The end portions 31, 32 are connected to the lower support portions 12, 13, respectively, of the suspension member 10. A rubber bush (not shown) is press fitted into each corresponding connection between the lower arm 30 and the lower support portions 12, 13. In the connected state where the end portions 31, 32 of the lower arm 30 are connected to the lower support portions 12, 13 of the suspension member 10, the lower arm 30 can move (pivot) vertically about the axis, which extends through the end portions 31, 32.

Figure 2:
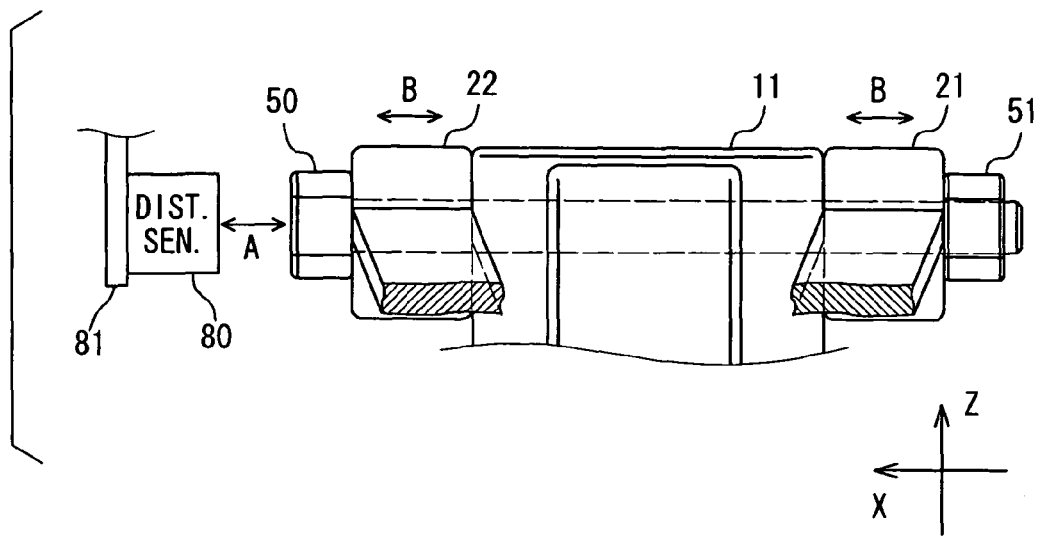
FIG. 2 is a schematic view showing a connection between an upper support portion of a suspension member and an upper arm according to the embodiment.

FIG. 2 is a schematic view being taken from the wheel 60 side and showing the connection between the upper support portion 11 of the suspension member 10 and the upper arm 20. Coordinate axes are shown at the right lower corner of FIG. 2. More specifically, a direction of the X-axis corresponds to a front-rear direction of the vehicle, and a direction of the Z-axis corresponds to a vertical direction of the vehicle.

As shown in FIG. 2, the bolt 50 extends through the upper support portion 11 of the suspension member 10 and the rod members 21, 22 of the upper arm 20. The nut 51 is threadably securely fitted to the distal end portion of the bolt 50, so that the suspension member 10 and the upper arm 20 are connected together.

A distance sensor 80, which acts as a displacement measurement sensor, is placed at a location that is adjacent to and is opposed to a head of the bolt (displaceable portion at the connection) 50 in the axial direction of the bolt 50. The distance sensor 80 is installed to a mount member 81, which is fixed to the vehicle body side member, to which the suspension member 10 is fixed. In the present embodiment, an eddy current sensor is used as the distance sensor 80. Alternatively, any other suitable known distance sensor, such as a photoelectric sensor, may be used as the distance sensor 80.

An amount of displacement of the head of the bolt 50 relative to the vehicle body in the axial direction of the bolt 50 (the front-rear direction of the vehicle) is sensed with the distance sensor 80, as indicated by an arrow A in FIG. 2.

Here, when the brake force or the drive force is applied to the tire, which is connected to the vehicle body through the upper arm 20, a force is applied to the upper arm 20 in a direction of an arrow B. The upper arm 20 and the upper support portion 11 of the suspension member 10 are deformed by this force in the direction of the arrow B, and the bolt 50 is moved in the same direction. Thus, the amount of displacement X1, which is measured with the distance sensor 80, is also the amount of displacement of the upper arm 20 and of the upper support portion 11 of the suspension member 10.

Figure 3:
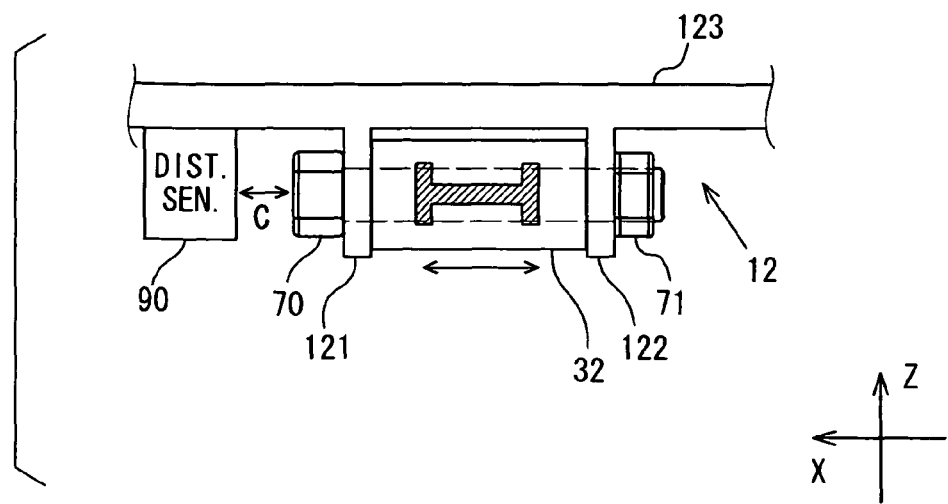
FIG. 3 is a schematic view showing a connection between a lower support portion of the suspension member and a lower arm according to the embodiment.

FIG. 3 is a schematic diagram showing the connection between the lower support portion 12 of the suspension member 10 and the lower arm 30. Similar to FIG. 2, coordinate axes are shown at the right lower corner of FIG. 3. Two opposed brackets 121, 122 project vertically from a base plate portion 123 of the lower support portion 12.

The end portion of the lower arm 30 is received between the brackets 121, 122. A bolt 70 extends through the brackets 121, 122 and the end portion 32 of the lower arm 30. When the nut 71 is threadably securely fitted to the distal end portion of the bolt 70, the lower support portion 12 of the suspension member 10 and the end portion 32 of the lower arm 30 are connected together.

Similar to the connection of the upper arm 20, a distance sensor 90, which acts as a displacement measurement sensor, is placed at a location that is adjacent to and is opposed to a head of the bolt (displaceable portion at the connection) 70 in the axial direction of the bolt 70. The distance sensor 90 is fixed to the base plate portion 123 of the lower support portion 12. Thus, the distance sensor 90 is fixed to the suspension member 10, which is the vehicle body side member. An eddy current sensor is used as the distance sensor 90. Alternatively, any other suitable known distance sensor, such as a photoelectric sensor, may be used as the distance sensor 90.

The amount of displacement X2 of the head of the bolt 70 relative to the base plate portion 123 of the lower support portion 12 of the suspension member 10 in the axial direction of the bolt 70 (the front-rear direction of the vehicle) is sensed with the distance sensor 90, as indicated by an arrow C in FIG. 3. Furthermore, the amount of the displacement X2 is also the amount of displacement of the lower arm 30 and of the brackets 121, 122.

Figure 4:
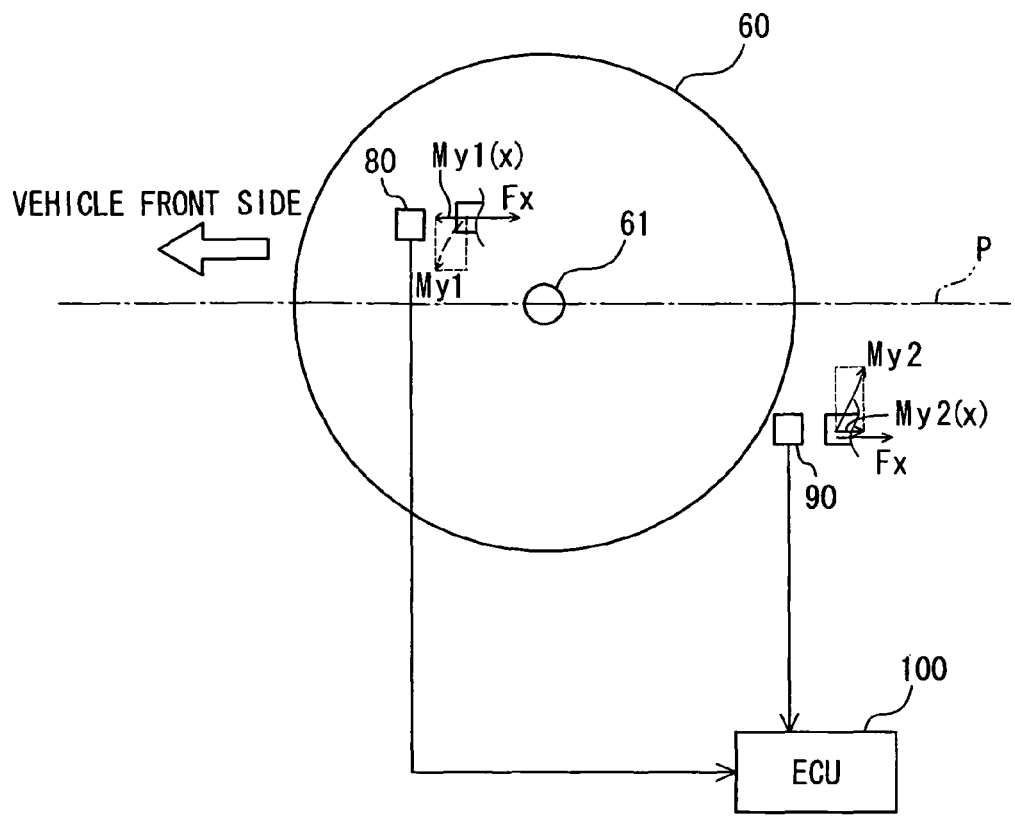
FIG. 4 is a descriptive schematic view showing locations of two distance sensors relative to an axle of a vehicle according to the embodiment and indicating an X-axis force component of a tire receiving force and a moment of the tire receiving force about a Y-axis.

FIG. 4 shows locations of the distance sensors 80, 90 relative to an axle 61. Also, FIG. 4 is used to describe influences of the X-axis force component (hereinafter, referred to as a front-rear force) Fx of the tire receiving force and the influences of the moment (also referred to as rotational moment or rotational force component) My of the tire receiving force about the Y-axis on the measured amounts of displacement, which are measured with the distance sensors 80, 90. Here, the direction of the X-axis refers to the front-rear direction of the vehicle, and the direction of the Y-axis refers to the axial direction of the axle 61 of the vehicle. The tire receiving force is divided into six force components, which include the above described two components (the X-axis force component and the moment about the Y-axis) and the Y-axis force component, the Z-axis (vertical) force component, the moment about the X-axis and the moment about the Z-axis.

The distance sensors 80, 90 are placed to measure the amount of displacement X1 in the direction of the X-axis and the amount of displacement X2 in the direction of the X-axis, respectively. Therefore, the amount of displacement X1 and the amount of displacement X2, which are respectively measured with the distance sensors 80, 90, reflect the degree of force applied in the direction of the X-axis. Here, the X-axis force component among the above six force components is a resultant force of the front-rear force Fx and the X-axis force component. This X-axis force component is obtained by breaking the moment My about the Y-axis into the X-axis force component and the Y-axis force component.

Therefore, the amount of displacement X1 and the amount of displacement X2, which are respectively measured with the distance sensors 80, 90, are under the influence of mainly the resultant force. That is, the amount of displacement X1, which is measured with the distance sensor 80, is the amount, on which the resultant force of the front-rear force Fx and the X-axis force component My1(x) of the moment My1 about the Y-axis is reflected. Furthermore, the amount of displacement X2, which is measured with the distance sensor 90, is the amount, on which the resultant force of the front-rear force Fx and the X-axis force component My2(x) of the moment My2 about the Y-axis is reflected.

Here, the distance sensor 80 and the distance sensor 90 are placed on the opposite sides, respectively, of an imaginary plane P that includes the axis of the axle 61. The X-axis force component My(x) of the moment My about the Y-axis is directed to the vehicle front side on the upper side of the imaginary plane P and is directed to the vehicle rear side on the lower side of the imaginary plane P. Therefore, the X-axis force component My1(x) of the moment My is directed in the direction that is opposite from that of the X-axis force component My2(x) of the moment My2. FIG. 4 shows the case where the brake force is applied, and the front-rear force Fx is exerted toward the vehicle rear side. In contrast, in the case where the drive force is applied to the drive wheels, the front-rear force Fx is exerted in the direction that is opposite from that of FIG. 4.

An electronic control unit (ECU) 100 shown in FIG. 4 serves as a computing means and is formed as a microcomputer having a memory (storage). The ECU 100 is connected to the distance sensors 80, 90 and senses application of the brake force or the drive force to the tire. When the ECU 100 senses the application of the brake force or the drive force to the tire, the ECU 100 computes a predetermined one or both of the front-rear force Fx and the moment My about the Y-axis depending on the need.

The ECU 100 senses the application of the brake force to the tire based on, for example, a signal from a brake switch, which indicates depression of a brake pedal and/or a signal from a hydraulic pressure sensor, which indicates an increase in the brake hydraulic pressure. Furthermore, the ECU 100 senses the application of the drive force to the tire based on a signal from an accelerator sensor, which indicates an increase in an opening degree of an accelerator.

Although any one or both of the front-rear force Fx and the moment My about the Y-axis can be set as the target force component(s), the following equation (1) and equation (2) may be solved for "Fx" in the case where the front-rear force Fx is used as the target force component. In contrast, when the moment My about the Y-axis is used as the target force component, the equation (1) and the equation (2) are solved for "My".

$$X1 = \alpha 1 Fx + \beta 1 My \qquad \text{Equation (1)}$$

$$X2 = \alpha 2 Fx + \beta 2 My \qquad \text{Equation (2)}$$

In the above equation (1) and the equation (2), each of $\alpha 1$, $\alpha 2$ denotes a corresponding coefficient, which includes a coefficient of elasticity (coefficient of resilience), and each of $\beta 1$, $\beta 2$ denotes a corresponding coefficient, which includes the corresponding coefficient of elasticity and a distance between the axle 61 and the installed location of the corresponding one of the distance sensors 80, 90. Accordingly, the equation (1) and the equation (2) imply that each of the front-rear force Fx and the moment My about the Y-axis is multiplied with the corresponding coefficient of elasticity to indicate the amounts of displacement, which are measured with the distance sensors 80, 90. The values of $\alpha 1$, $\alpha 2$, $\beta 1$, $\beta 2$ vary depending on the installed locations of the distance sensors 80, 90 and are preset based the experimental results.

The force component(s), which is computed by the ECU 100, may be outputted to a control device(s), which executes the braking control operation and the driving control operation.

According to the present embodiment described above, the distance sensor 80 measures the amount of displacement X1 of the connection between the suspension member 10 and the upper arm 20 in the front-rear direction of the vehicle, and the distance sensor 90 measures the amount of displacement X2 of the connection between the suspension member 10 and the lower arm 30 in the front-rear direction of the vehicle. The amount of displacement X1 and the amount of displacement X2 include the target force component (one of the front-rear force Fx and the moment My about the Y-axis) and the non-target force component (the other one of the front-rear force Fx and the moment My about the Y-axis). Therefore, according to the present embodiment, the equation (1) and the equation (2), for which the corresponding coefficients are preset, are used to compute the target force component while eliminating the influence of the non-target force component (unnecessary force component) from the amount of displacement X1 and the amount of displacement X2.

The force component of the tire receiving force is computed in the above described manner, so that it is only required to measure the amount of displacement of the connection between the preexisting suspension member 10 and the preexisting upper arm 20 and the amount of displacement of the connection between the preexisting suspension member 10 and the preexisting lower arm 30. Therefore, the structure of the tire receiving force sensing apparatus of the present embodiment becomes simple.

Furthermore, in the present embodiment, the distance sensors 80, 90 are both installed to the vehicle body side member, so that wire harnesses, which extend from the distance sensors 80, 90, can be fixed to the vehicle body. Therefore, it is possible to minimize the costs and to achieve the required reliability.

Although the one embodiment of the present invention is described above, the present invention is not limited to the above embodiment, and the above embodiment may be modified without departing from the spirit and scope of the present invention.

Figure 5:
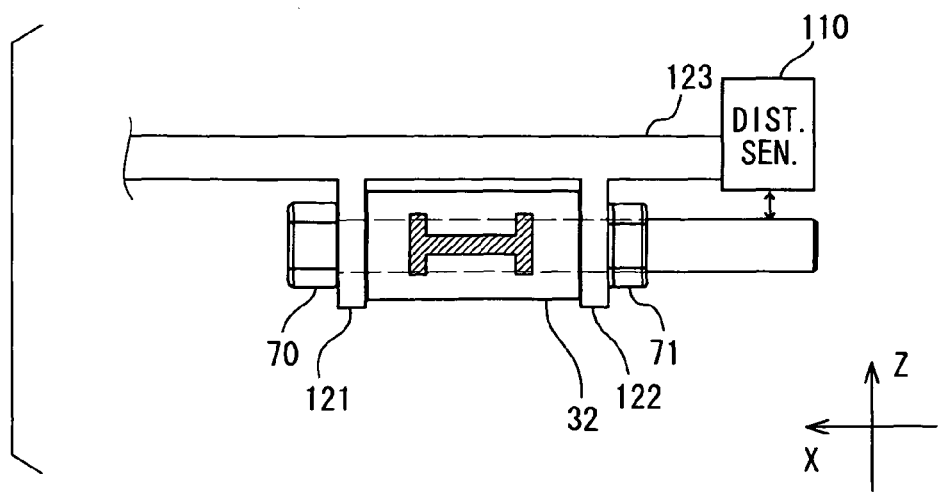
FIG. 5 is a schematic view showing a location of a distance sensor, which measures a Z-axis force component or a Y-axis force component of the tire receiving force in a modification of the embodiment.

For example, in the above embodiment, the one or both of the X-axis force component and the moment My about the Y-axis would be computed among the six force components of the tire receiving force. Alternatively, the tire receiving force sensing apparatus may be configured to measure the other force component(s), such as the Y-axis force component, the Z-axis force component. For instance, in the case where the Z-axis force component or moment about the Y-axis is measured, the multiple distance sensors are preferably placed at the corresponding locations, at which the displacements of the displaceable portions in the direction of the Z-axis can be measured with the distance sensors. This is due to the fact that the amounts of displacement, which are measured with the distance sensors, are under the influence of mainly the Z-axis force component and the moment about the Y-axis in the tire receiving force in the case where the distance sensors are placed at the corresponding locations, at which the displacements of the displaceable portions in the direction of the Z-axis can be measured with the distance sensors. FIG. 5 shows the exemplary location of the distance sensor 110 used in the above case, and coordinate axes are indicated at the right lower corner of FIG. 5, like in FIG. 2. In FIG. 5, the distance sensor 110 is installed to the end portion of the base plate portion 123 and is oriented to the corresponding direction that is appropriate for measuring the displacement in the direction of the Z-axis. In the case of FIG. 5, the length of the bolt 70 is set such that the bolt 70 sufficiently projects from the nut 71. With this construction, the displacement of the bolt 70 in the direction of the Z-axis is measured with the distance sensor 110.

Furthermore, in the above embodiment, the distance sensors are used as the displacement measurement sensors. However, in place of the distance sensors, it is possible to use load sensors. Also, the number of the displacement measurement sensors may be set to three or more.

Additional advantages and modifications will readily occur to those skilled in the art. The invention in its broader terms is therefore not limited to the specific details, representative apparatus, and illustrative examples shown and described.

What is claimed is:

1. A tire receiving force sensing apparatus that senses a tire receiving force, which is applied to a tire of a vehicle connected to a vehicle body through a suspension device, the tire receiving force sensing apparatus comprising:

a plurality of displacement measurement sensors, each of which is fixed to the vehicle body at a location adjacent to a corresponding one of a plurality of connections, each of which has an axis generally extending in a front-rear direction of the vehicle and connects between a corresponding support portion of the vehicle body and a corresponding portion of the suspension device in such a manner that the corresponding portion of the suspension device is pivotable relative to the corresponding support portion of the vehicle body about the axis of the connection and is not movable relative to the corresponding support portion of the vehicle body in a direction of the axis of the connection, wherein each of the plurality of connections is displaced relative to the corresponding displacement measurement sensor fixed to the vehicle body upon application of at least one of a brake force and a drive force to the tire, and wherein each of the plurality of displacement measurement sensors measures an amount of displacement of the corresponding one of the plurality of connections upon the application of the at least one of the brake force and the drive force to the tire; and means for computing a target tire receiving force component based on the amounts of displacement, which are measured with the plurality of displacement measurement sensors, respectively.

2. The tire receiving force sensing apparatus according to claim 1, wherein at least one of the plurality of displacement measurement sensors is placed on a first side of an imaginary plane, which is opposite from a second side of the imaginary plane where the rest of the plurality of displacement measurement sensors is placed, and the imaginary plane includes two of three right angled axes that serve as three reference axes for six tire force components.

3. The tire receiving force sensing apparatus according to claim 2, wherein the imaginary plane is a horizontal plane, which includes an axis of an axle of the vehicle connected to the tire and a front-rear axis of the vehicle, and the at least one of the plurality of displacement measurement sensors is placed on the first side of the horizontal plane, which is opposite from the second side of the horizontal plane where the rest of the plurality of displacement measurement sensors is placed.

4. The tire receiving force sensing apparatus according to claim 1, wherein the computing means eliminates a rotational moment as the unnecessary tire receiving force component and computes an axial force component as the target tire receiving force component based on the amounts of displacement, which are measured with the plurality of displacement measurement sensors.

5. The tire receiving force sensing apparatus according to claim 1, wherein the computing means eliminates an axial force component as the unnecessary tire receiving force component and computes a rotational moment as the target tire receiving force component based on the amounts of displacement, which are measured with the plurality of displacement measurement sensors.

* * * * *